(12) United States Patent
Deshmukh et al.

(10) Patent No.: US 9,952,064 B2
(45) Date of Patent: Apr. 24, 2018

(54) TRANSFORMER POSITION SENSOR WITH SHORTED COIL

(71) Applicant: HONEYWELL INTERNATIONAL INC., Morristown, NJ (US)

(72) Inventors: Vikrant Deshmukh, Karnataka (IN); John Jerred, East Jordan, MI (US)

(73) Assignee: Honeywell International Inc., Morris Plains, NJ (US)

( * ) Notice: Subject to any disclaimer, the term of this patent is extended or adjusted under 35 U.S.C. 154(b) by 691 days.

(21) Appl. No.: 14/090,432

(22) Filed: Nov. 26, 2013

(65) Prior Publication Data
US 2015/0145507 A1    May 28, 2015

(51) Int. Cl.
| | |
|---|---|
| H01F 21/06 | (2006.01) |
| G01B 7/14 | (2006.01) |
| G01B 7/30 | (2006.01) |
| H01F 5/00 | (2006.01) |
| G01D 5/22 | (2006.01) |
| G01B 7/00 | (2006.01) |

(52) U.S. Cl.
CPC ........... G01D 5/2291 (2013.01); G01B 7/003 (2013.01)

(58) Field of Classification Search
CPC .................................. H01F 27/28; H01F 5/00
USPC ................. 336/130–136, 200, 232; 324/207.11–207.19
See application file for complete search history.

(56) References Cited

U.S. PATENT DOCUMENTS

| | | | | | |
|---|---|---|---|---|---|
| 3,138,772 | A | * | 6/1964 | Persons, Jr. ............. | H01F 29/10 336/130 |
| 2008/0278149 | A1 | * | 11/2008 | Gualtieri .............. | G01D 5/2073 324/207.17 |

FOREIGN PATENT DOCUMENTS

| | | | | | |
|---|---|---|---|---|---|
| GB | 2129621 | A | * | 5/1984 | ............. H01F 21/06 |
| JP | 63225102 | A | * | 9/1988 | |
| WO | WO 2006045210 | A1 | * | 5/2006 | ............. G01D 5/206 |
| WO | WO 2013100429 | A1 | * | 7/2013 | ............. H01F 29/14 |

* cited by examiner

*Primary Examiner* — Tsz Chan
(74) *Attorney, Agent, or Firm* — Craige Thompson; Thompson Patent Law

(57) ABSTRACT

A transformer position sensor includes a primary coil, a secondary coil, and an electrically shorted coil. The primary coil is adapted to receive an excitation signal and is configured, upon receipt of the excitation signal, to generate a primary magnetic flux. The secondary coil is inductively coupled to the primary coil upon electrical excitation of the primary coil, and includes a plurality of differentially wound coils. The electrically shorted coil is inductively coupled to receive at least a portion of the primary magnetic flux generated by the primary coil. The electrically shorted coil is configured, upon receipt of at least a portion of the primary magnetic flux, to generate a magnetic flux that opposes the primary magnetic flux.

20 Claims, 3 Drawing Sheets

| | WITH SHORT WINDING | WITHOUT SHORT WINDING |
|---|---|---|
| PRIMARY INDEPENDENCE (ohm) | 681 TO 676 | 1146 TO 1214 |
| PHASE SHIFT (deg) | 1.5 DEG | 1 DEG |
| POWER FACTOR | 0.89 TO 0.9 | 0.32 TO 0.34 |

| | WITH SHORT WINDING | WITHOUT SHORT WINDING |
|---|---|---|
| PRIMARY INDEPENDENCE (ohm) | 665 TO 672 | 1002 TO 1125 |
| PHASE SHIFT (deg) | 2.3 DEG | 2 DEG |
| POWER FACTOR | 0.85 TO 0.88 | 0.30 TO 0.32 |

TRANSFORMER POSITION SENSOR WITH SHORTED COIL

TECHNICAL FIELD

The present invention generally relates to transformer position sensors, and more particularly relates to a transformer position sensor with a shorted coil.

BACKGROUND

Position sensors are included in various systems, devices, and environments. Moreover, various types of position sensors have been developed for inclusion into these various systems, devices, and environments. One particular genre of position sensor that has been developed is the transformer position sensor. A transformer position sensor typically includes a primary or excitation coil, a secondary or output coil, and a movable magnetically permeable core. When the excitation coil is electrically excited with an excitation signal, the output coil is inductively coupled to the excitation coil and supplies an output signal that is based on the position of the movable core. One particularly popular type of transformer position sensor is the variable differential transformer position sensor, which includes linear variable differential transformers (LVDTs) and rotary variable differential transformers (RVDTs). A variable differential transformer position sensor also includes an excitation coil, an output coil, and a movable magnetically permeable core. However, with variable differential transformer position sensors the output coil is typically configured as a pair of differentially wound coils that are electrically coupled in series.

The transformer position sensors described above are generally reliable and robust, but do suffer certain drawbacks. For example, many transformer position sensors exhibit a phase shift between the excitation signal and the output signal, which can lead to non-linearity. Many transformer position sensors may also exhibit undesirably low power factors. Various solutions have been proposed too address these drawbacks. These solutions include increasing the length of the magnetically permeable core, increasing the number of turns of the excitation coil, and using relatively high permeable material. Unfortunately, these proposed solutions exhibit their own drawbacks. In particular, these solutions can increase the impedance of one or both of the excitation coil and output coil, and adversely impact power factor.

Hence, there is a need for a transformer-type position sensor that exhibits improved phase shift between the excitation signal and the output signal, as compared with presently known sensors, without adversely impacting power factor. The present invention addresses at least this need.

BRIEF SUMMARY

In one embodiment, a transformer position sensor includes a primary coil, a secondary coil, and an electrically shorted coil. The primary coil is adapted to receive an excitation signal and is configured, upon receipt of the excitation signal, to generate a primary magnetic flux. The secondary coil is inductively coupled to the primary coil upon electrical excitation of the primary coil, and includes a plurality of differentially wound coils. The electrically shorted coil is inductively coupled to receive at least a portion of the primary magnetic flux generated by the primary coil. The electrically shorted coil is configured, upon receipt of at least a portion of the primary magnetic flux, to generate a magnetic flux that opposes the primary magnetic flux.

In another embodiment, a transformer position sensor includes a primary coil, a secondary coil, and electrically shorted coil, and a magnetically permeable core. The primary coil is adapted to receive an excitation signal and is configured, upon receipt of the excitation signal, to generate a primary magnetic flux. The secondary coil is inductively coupled to the primary coil upon electrical excitation of the primary coil, and includes a plurality of differentially wound coils. The electrically shorted coil is inductively coupled to receive at least a portion of the primary magnetic flux generated by the primary coil. The electrically shorted coil is configured, upon receipt of at least a portion of the primary magnetic flux, to generate a magnetic flux that opposes the primary magnetic flux. The magnetically permeable core is disposed adjacent to, and is movable relative to, the electrically shorted coil. The primary coil, the secondary coil, and the electrically shorted coil are concentrically disposed.

In yet another embodiment, a transformer position sensor includes a primary coil, a secondary coil, and electrically shorted coil, a magnetically permeable core, and a signal source. The primary coil is coupled to receive an excitation signal and is configured, upon receipt of the excitation signal, to generate a primary magnetic flux. The secondary coil is inductively coupled to the primary coil upon electrical excitation of the primary coil, and includes a plurality of differentially wound coils. The electrically shorted coil is inductively coupled to receive at least a portion of the primary magnetic flux generated by the primary coil. The electrically shorted coil is configured, upon receipt of at least a portion of the primary magnetic flux, to generate a magnetic flux that opposes the primary magnetic flux. The magnetically permeable core is disposed adjacent to, and is movable relative to, the electrically shorted coil. The signal source is coupled to the primary coil and is operable to supply an excitation signal thereto.

Furthermore, other desirable features and characteristics of the transformer position sensor will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
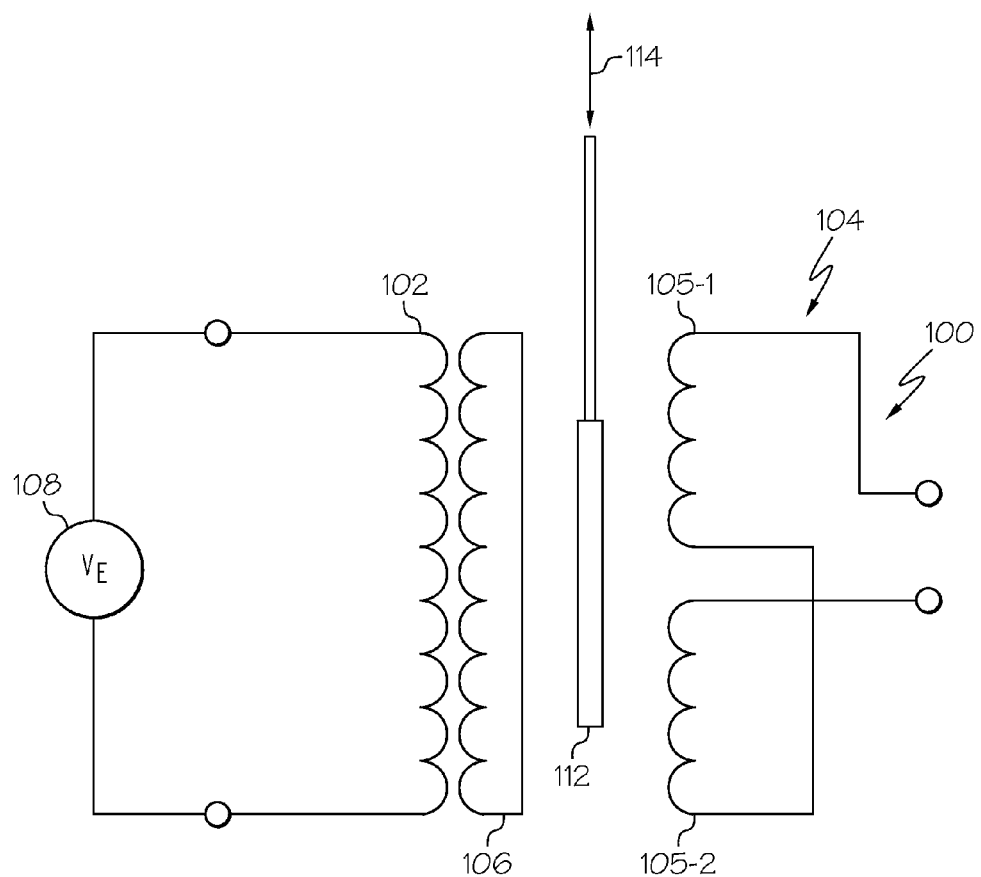
FIG. 1 depicts a schematic diagram of an exemplary embodiment of a linear variable differential transformer (LVDT) position sensor.

Referring to FIG. 1, a schematic diagram of an exemplary embodiment of a linear variable differential transformer (LVDT) position sensor 100 is depicted and includes a primary coil 102, a secondary coil 104, and an electrically shorted coil 106. The primary coil 102 is adapted to receive an excitation signal from an excitation signal source 108. Indeed, in FIG. 1, the primary coil 102 is shown coupled to, and is thus electrically excited by the excitation signal supplied from, the excitation signal source 108.

The secondary coil 104 comprises a plurality of differentially wound coils 105-1, 105-2, and is disposed such that it is inductively coupled to the primary coil 102 when the primary coil 102 is electrically excited. As a result, when the primary coil 102 is electrically excited with an excitation signal, the secondary coil 104 supplies an output signal to a non-illustrated load.

The electrically shorted coil 106, as this nomenclature implies, is electrically shorted. The electrically shorted coil 106 is disposed such that it is inductively coupled to the primary coil 102 and the secondary coil 104 when the primary coil 102 is electrically excited.

As FIG. 1 further depicts, the LVDT position sensor 100 additionally includes a movable core 112. The movable core 112, as depicted via direction arrow 114, is also movable relative to the primary, secondary, and electrically shorted coils 102, 104 and 106. The movable core 112 is preferably formed of a magnetically permeable material. As a result, movement of the core 112 causes variations in the output signal supplied from the secondary coil 104.

It will be appreciated that the relative disposition of the primary coil 102, the secondary coil 104, and the electrically shorted coil 106 may vary. In one particular embodiment, such as the one depicted in FIG. 2, the LVDT position sensor 100 is configured as a long-stroke LVDT position sensor. In this embodiment, the primary, secondary, and electrically shorted coils 102, 104, 106 are concentrically disposed with the secondary coil 104 surround, or at least partially surround, both the primary coil 102 and the electrically shorted coil 106. Moreover, the primary coil 102 surrounds, or at least partially surrounds, the electrically shorted coil 106. To construct this embodiment, the electrically shorted winding 106 is wound onto a bobbin 202. Preferably, the electrically shorted coil 106 is first wound uniformly (with constant pitch) onto the bobbin 202, and its terminals are electrically shorted. Because the electrically shorted coil 106 has not external connections, it is completely isolated from external circuit connections. After winding the electrically shorted coil 106, the primary coil 102 and the secondary coil 104 are wound onto the bobbin 202. Preferably, the primary coil 102 is wound uniformly, while the secondary coil 104 is wound with a variable pitch.

Figure 3:
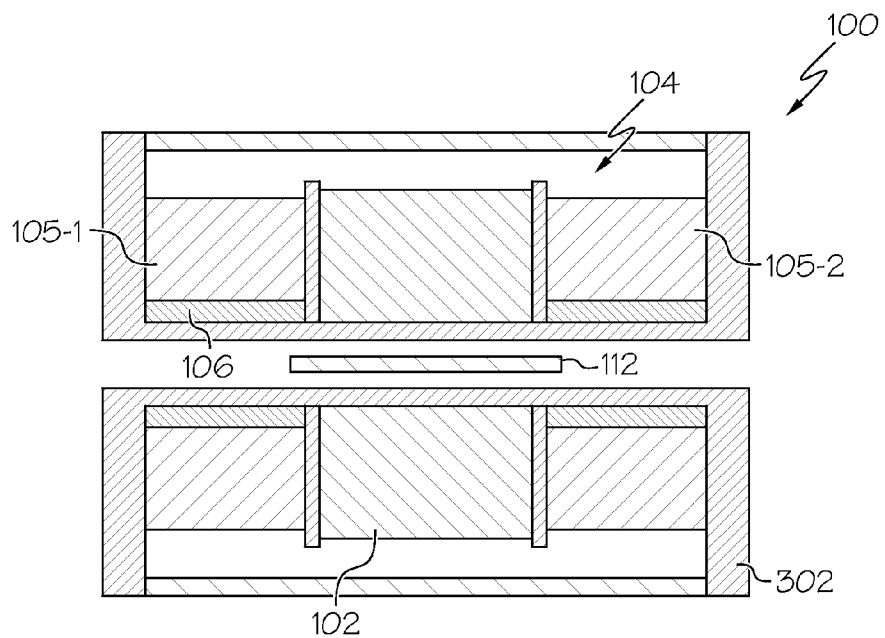
FIG. 3 depicts a simplified cross section view of the exemplary LVDT position sensor of FIG. 1 configured as a short-stroke LVDT position sensor.

In another embodiment, such as the one depicted in FIG. 3, the LVDT position sensor 100 is configured as a short-stroke LVDT position sensor. In this embodiment, the primary, secondary, and electrically shorted coils 102, 104, 106 are also concentrically disposed. However, the secondary coil 104 surrounds, or at least partially surrounding, only the electrically shorted coil 106. To construct this embodiment, the electrically shorted winding 106 is first wound onto a bobbin 302. Here again, the electrically shorted coil 106 is preferably wound uniformly onto the bobbin 302, and its terminals are electrically shorted. After winding the electrically shorted coil 106, the primary coil 102 and the secondary coil 104 are wound onto the bobbin 302. In this embodiment, the primary coil 102 and the secondary coil 104 are both wound uniformly.

Regardless of whether LVDT position sensor 100 is configured as a long-stroke or a short-stroke LVDT position sensor, the principle of operation remains substantially the same. In particular, when the primary coil 102 is supplied with an excitation signal from the excitation signal source 108, a varying magnetic flux is generated. This varying magnetic flux causes voltages to induced in both the secondary winding 104 and the electrically shorted winding 106 and, as a result, current to flow in both windings 104, 106. The current flow in the electrically shorted coil 106 will generate a flux that opposes the flux generated by primary coil excitation. This reduces primary self-flux linkage, and thereby reduces the impedance of the primary coil 106. Because of this, the phase shift between is reduced, which in turn improves the power factor.

Figure 2:
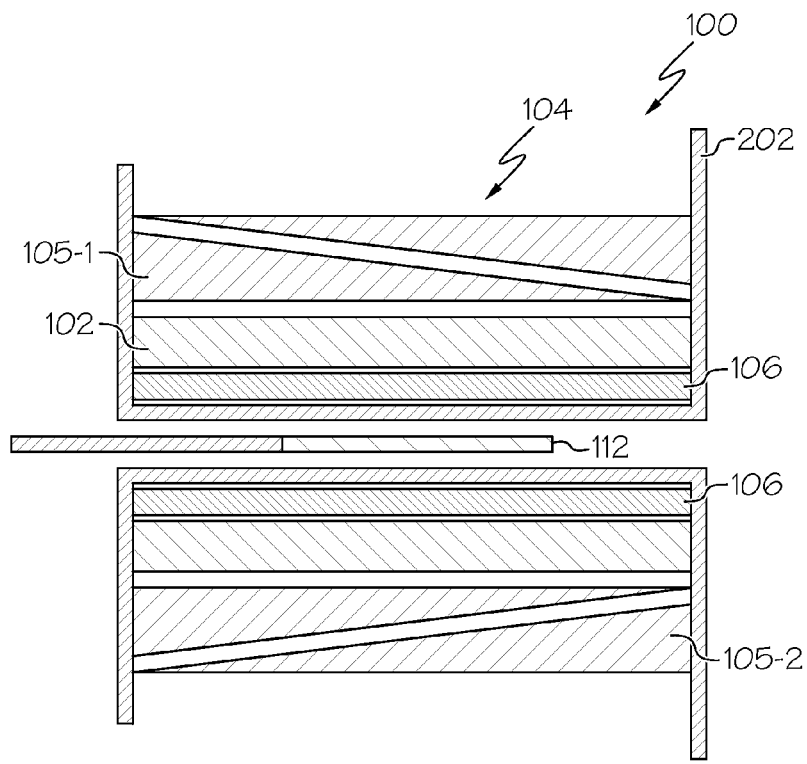
FIG. 2 depicts a simplified cross section view of the exemplary LVDT position sensor of FIG. 1 configured as a long-stroke LVDT position sensor.
Figure 4:
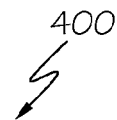
FIG. 4 is a table that compares results of primary coil impedance, phase shift, and power factor for a simulated LVDT sensor configured similar to the one depicted in FIG. 2 and a conventional LVDT.
Figure 5:
FIG. 5 is a table that compares results of primary coil impedance, phase shift, and power factor for an actual LVDT sensor configured similar to the one depicted in FIG. 2 and a conventional LVDT.

Both simulation and actual testing of the embodiment depicted in FIG. 2 have shown improved performance over conventional LVDTs that do not include the electrically shorted coil 106. For example, FIG. 4 is a table 400 that compares results of primary coil impedance, phase shift, and power factor for a simulated LVDT sensor configured similar to the one depicted in FIG. 2 and a conventional LVDT. In FIG. 5, the table 500 compares results of primary coil impedance, phase shift, and power factor for an actual LVDT sensor configured similar to the one depicted in FIG. 2 and a conventional LVDT. In both of these comparisons it is readily seen that the primary impedance of the LVDT sensor 100 with the shorted coil 106 is significantly reduced as compared to the conventional LVDT. While the phase shifts remain comparable, the power factor of the LVDT sensor 100 with the shorted coil 106 is significantly improved as compared to the conventional LVDT.

Moreover, although not depicted in tabular form herein, it is noted that simulated and actual phase shift data for a short-stroke LVDT sensor configured similar to the one depicted in FIG. 3 also show significant improvement. In particular, the simulated phase-shift data for a conventional short-stroke LVDT ranges from 13.2-degrees to −13.3-degrees for a range of movement of the movable core 112 of +0.5-inches to −0.5 inches. Actual phase-shift data for the conventional short-stroke LVDT ranges from 14.2-degrees to −13.5-degrees for this same range of movement. Conversely, for the short-stroke LVDT sensor configured similar to the one depicted in FIG. 3, and with the same range of movable core movement, the simulated and actual phase-shift data ranges from 3.2-degrees to −3.3-degrees and 8.2-degrees to −8.1-degrees, respectively.

The LVDT position sensor 100 described herein provides significantly reduced primary coil impedance as compared to conventional LVDTs. As a result, the primary coil 102 can be wound with a relatively high number of turns, which contributes to lowering the phase shift and improving the power factor. A relatively low phase shift improves sensor linearity. This also allows the LVDT position sensor 100 to be implemented with a movable core 112 that has the same length as a conventional LVDT, and using the same relatively low cost, low permeable material.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A transformer position sensor, comprising:
   a primary coil adapted to receive an excitation signal and configured, upon receipt of the excitation signal, to generate a primary magnetic flux;
   a secondary coil inductively coupled to the primary coil upon electrical excitation of the primary coil, the secondary coil comprising a plurality of differentially wound coils; and
   an electrically shorted coil inductively coupled to receive at least a portion of the primary magnetic flux generated by the primary coil, the electrically shorted coil configured, upon receipt of at least a portion of the primary magnetic flux, to generate a magnetic flux that opposes the primary magnetic flux, wherein the primary coil, the secondary coil, and the electrically shorted coil are wound about a bobbin and disposed in a fixed, non-movable relationship with respect to each other.

2. The sensor of claim 1, further comprising:
   a magnetically permeable core disposed adjacent to, and movable relative to, the electrically shorted coil.

3. The sensor of claim 1, wherein the primary coil, the secondary coil, and the electrically shorted coil are concentrically disposed.

4. The sensor of claim 3, wherein the secondary coil surrounds at least a portion of the primary coil and the electrically shorted coil.

5. The sensor of claim 3, wherein the primary coil is concentrically disposed between at least a portion of the electrically shorted coil and at least a portion of the secondary coil.

6. The sensor of claim 5, wherein the sensor is configured as a long-stroke linear variable differential transformer sensor.

7. The sensor of claim 3, wherein the secondary coil surrounds at least a portion of the electrically shorted coil.

8. The sensor of claim 7, wherein the sensor is configured as a short-stroke linear variable differential transformer sensor.

9. The sensor of claim 1, further comprising:
   a signal source coupled to the primary coil and operable to supply an excitation signal thereto.

10. A transformer position sensor, comprising:
a primary coil adapted to receive an excitation signal and configured, upon receipt of the excitation signal, to generate a primary magnetic flux;
a secondary coil inductively coupled to the primary coil upon electrical excitation of the primary coil, the secondary coil comprising a plurality of differentially wound coils;
an electrically shorted coil inductively coupled to receive at least a portion of the primary magnetic flux generated by the primary coil, the electrically shorted coil configured, upon receipt of at least a portion of the primary magnetic flux, to generate a magnetic flux that opposes the primary magnetic flux, wherein the primary coil, the second coil, and the electrically shorted coil are wound about a bobbin and disposed in a fixed, non-movable relationship with respect to each other; and
a magnetically permeable core disposed adjacent to, and movable relative to, the electrically shorted coil,
wherein the primary coil, the secondary coil, and the electrically shorted coil are concentrically disposed.

11. The sensor of claim 10, wherein the secondary coil surrounds at least a portion of the primary coil and the electrically shorted coil.

12. The sensor of claim 11, wherein the primary coil is concentrically disposed between at least a portion of the electrically shorted coil and at least a portion of the secondary coil.

13. The sensor of claim 12, wherein the sensor is configured as a long-stroke linear variable differential transformer sensor.

14. The sensor of claim 11, wherein the secondary coil surrounds at least a portion of the electrically shorted coil.

15. The sensor of claim 14, wherein the sensor is configured as a short-stroke linear variable differential transformer sensor.

16. The sensor of claim 10, further comprising:
a signal source coupled to the primary coil and operable to supply an excitation signal thereto.

17. A transformer position sensor, comprising:
a primary coil coupled to receive an excitation signal and configured, upon receipt of the excitation signal, to generate a primary magnetic flux;
a secondary coil inductively coupled to the primary coil upon electrical excitation of the primary coil, the secondary coil comprising a plurality of differentially wound coils;
an electrically shorted coil inductively coupled to receive at least a portion of the primary magnetic flux generated by the primary coil, the electrically shorted coil configured, upon receipt of at least a portion of the primary magnetic flux, to generate a magnetic flux that opposes the primary magnetic flux, wherein the primary coil, the secondary coil, and the electrically shorted coil are wound about a bobbin and disposed in a fixed, non-moveable relationship with respect to each other;
a magnetically permeable core disposed adjacent to, and movable relative to, the electrically shorted coil; and
a signal source coupled to the primary coil and operable to supply an excitation signal thereto.

18. The transformer position sensor of claim 17, wherein the primary coil, the secondary coil, and the electrically shorted coil are concentrically disposed.

19. The transformer position sensor of claim 18, wherein the secondary coil surrounds at least a portion of the primary coil and the electrically shorted coil.

20. The transformer position sensor of claim 18, wherein the primary coil is concentrically disposed between at least a portion of the electrically shorted coil and at least a portion of the secondary coil.

* * * * *